(12) United States Patent
Mahmoud et al.

(10) Patent No.: US 11,320,718 B1
(45) Date of Patent: May 3, 2022

(54) CANTILEVER BEAM WAVEGUIDE FOR SILICON PHOTONICS DEVICE

(71) Applicant: Apple Inc., Cupertino, CA (US)

(72) Inventors: Mohamed Mahmoud, Sunnyvale, CA (US); Alfredo Bismuto, Oakland, CA (US); Mark Alan Arbore, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/998,816

(22) Filed: Aug. 20, 2020

Related U.S. Application Data

(60) Provisional application No. 62/906,595, filed on Sep. 26, 2019.

(51) Int. Cl.
  *G02F 1/313* (2006.01)

(52) U.S. Cl.
  CPC .......... *G02F 1/313* (2013.01); *G02F 2203/24* (2013.01)

(58) Field of Classification Search
  CPC .............................. G02F 1/313; G02F 2203/24
  See application file for complete search history.

(56) References Cited

U.S. PATENT DOCUMENTS

| | | | |
|---|---|---|---|
| 5,287,376 A | 2/1994 | Paoli | |
| 5,488,678 A | 1/1996 | Taneya | |
| 5,644,667 A | 7/1997 | Tabuchi | |
| 5,742,631 A | 4/1998 | Paoli | |
| 6,122,042 A | 9/2000 | Wunderman et al. | |
| 6,330,378 B1 | 12/2001 | Forrest | |
| 6,393,185 B1 | 5/2002 | Deacon | |
| 6,465,929 B1 * | 10/2002 | Levitan | B81B 3/0037 310/309 |
| 6,519,382 B1 * | 2/2003 | Jurbergs | G02B 6/3502 385/16 |
| 6,594,409 B2 | 7/2003 | Dutt et al. | |
| 6,628,686 B1 | 9/2003 | Sargent | |
| 6,628,858 B2 * | 9/2003 | Zhang | G02B 6/12007 385/16 |
| 6,657,723 B2 | 12/2003 | Cohen | |
| 6,795,622 B2 | 9/2004 | Forrest | |

(Continued)

FOREIGN PATENT DOCUMENTS

| | | |
|---|---|---|
| EP | 1403985 | 3/2004 |
| EP | 1432045 | 6/2004 |

(Continued)

OTHER PUBLICATIONS

Chang et al., A Comb-Drive Actuator Driven by Capacitively-Coupled-Power, Sensors 2012, 12, 10881-10889; doi:10.3390/s120810881 (Year: 2012).*

(Continued)

*Primary Examiner* — Peter Radkowski
(74) *Attorney, Agent, or Firm* — Brownstein Hyatt Farber Schreck, LLP

(57) ABSTRACT

A cantilever beam waveguide for a silicon photonics device may be formed in a device layer (e.g., a silicon device layer) of a silicon photonics device (e.g., a chip) and may be configured to bend to align the cantilever beam waveguide or a portion thereof with one or more additional components of the silicon photonics device or another device, including output couplers, optical sources, and waveguides.

19 Claims, 10 Drawing Sheets

(56) References Cited

U.S. PATENT DOCUMENTS

| | | | |
|---|---|---|---|
| 6,801,679 B2 * | 10/2004 | Koh | G02B 6/12004 213/24 |
| 6,892,449 B1 | 5/2005 | Brophy et al. | |
| 6,940,182 B2 | 9/2005 | Hilton et al. | |
| 6,947,639 B2 | 9/2005 | Singh | |
| 6,952,504 B2 | 10/2005 | Bi | |
| 6,987,906 B2 | 1/2006 | Nakama et al. | |
| 7,054,517 B2 | 5/2006 | Mossberg | |
| 7,058,245 B2 | 6/2006 | Farahi | |
| 7,079,715 B2 | 7/2006 | Kish | |
| 7,085,445 B2 * | 8/2006 | Koh | G02B 6/3502 385/16 |
| 7,203,401 B2 | 4/2007 | Mossberg | |
| 7,203,426 B2 | 4/2007 | Wu et al. | |
| 7,209,611 B2 | 4/2007 | Joyner | |
| 7,245,379 B2 | 7/2007 | Schwabe | |
| 7,283,694 B2 | 10/2007 | Welch | |
| 7,314,451 B2 | 1/2008 | Halperin et al. | |
| 7,324,195 B2 | 1/2008 | Packirisamy et al. | |
| 7,366,364 B2 | 4/2008 | Singh | |
| 7,447,393 B2 | 11/2008 | Yan | |
| 7,460,742 B2 | 12/2008 | Joyner | |
| 7,477,384 B2 | 1/2009 | Schwabe | |
| 7,483,599 B2 | 1/2009 | Dominic et al. | |
| 7,526,007 B2 | 4/2009 | Chua et al. | |
| 7,558,301 B2 | 7/2009 | Lin et al. | |
| 7,680,364 B2 | 3/2010 | Nilsson | |
| 7,720,328 B2 | 5/2010 | Yan | |
| 7,885,302 B2 | 2/2011 | Eberhard | |
| 7,885,492 B2 | 2/2011 | Welch | |
| 7,974,504 B2 | 7/2011 | Nagarajan | |
| 8,300,994 B2 | 10/2012 | Welch et al. | |
| 8,559,775 B2 | 10/2013 | Babie et al. | |
| 8,564,784 B2 | 10/2013 | Wang et al. | |
| 8,724,100 B1 | 5/2014 | Asghari et al. | |
| 8,920,332 B2 | 12/2014 | Hong et al. | |
| 8,983,250 B2 | 3/2015 | Black et al. | |
| 9,020,004 B2 | 4/2015 | Jeong | |
| 9,031,412 B2 | 5/2015 | Nagarajan | |
| 9,110,259 B1 | 8/2015 | Black | |
| 9,135,397 B2 | 9/2015 | Denyer et al. | |
| 9,176,282 B2 | 11/2015 | Pottier | |
| 9,217,669 B2 | 12/2015 | Wu et al. | |
| 9,348,154 B2 | 5/2016 | Hayakawa | |
| 9,370,689 B2 | 6/2016 | Guillama et al. | |
| 9,405,066 B2 | 8/2016 | Mahgerefteh | |
| 9,543,736 B1 | 1/2017 | Barwicz et al. | |
| 9,620,931 B2 | 4/2017 | Tanaka | |
| 9,766,370 B2 | 9/2017 | Aloe et al. | |
| 9,804,027 B2 | 10/2017 | Fish et al. | |
| 9,829,631 B2 | 11/2017 | Lambert | |
| 9,880,352 B2 | 1/2018 | Florjanczyk | |
| 9,943,237 B2 | 4/2018 | Baker et al. | |
| 9,948,063 B2 | 4/2018 | Caneau et al. | |
| 10,009,668 B2 | 6/2018 | Liboiron-Ladouceur | |
| 10,132,996 B2 | 11/2018 | Lambert | |
| 10,238,351 B2 | 3/2019 | Halperin et al. | |
| 10,285,898 B2 | 5/2019 | Douglas et al. | |
| 10,310,196 B2 | 6/2019 | Hutchison | |
| 10,429,597 B2 | 10/2019 | ten Have et al. | |
| 10,529,003 B2 | 1/2020 | Mazed | |
| 10,687,718 B2 | 6/2020 | Allec et al. | |
| 10,852,492 B1 | 12/2020 | Vermeulen et al. | |
| 2003/0113067 A1 * | 6/2003 | Koh | G02B 6/43 385/48 |
| 2003/0128918 A1 * | 7/2003 | Zhang | G02B 6/3536 385/24 |
| 2004/0008921 A1 * | 1/2004 | Kanie | G02B 6/3596 385/14 |
| 2004/0037488 A1 * | 2/2004 | Guidotti | G02B 6/3536 385/16 |
| 2004/0184720 A1 * | 9/2004 | Kubby | G02B 6/358 385/22 |
| 2004/0264847 A1 * | 12/2004 | Koh | G02B 6/3502 385/22 |
| 2005/0053112 A1 | 3/2005 | Shams-Zadeh-Amiri | |
| 2005/0063431 A1 | 3/2005 | Gallup et al. | |
| 2006/0002443 A1 | 1/2006 | Farber et al. | |
| 2008/0044128 A1 | 2/2008 | Kish et al. | |
| 2008/0310470 A1 | 12/2008 | Ooi et al. | |
| 2014/0029943 A1 | 1/2014 | Mathai et al. | |
| 2016/0026253 A1 * | 1/2016 | Bradski | H04N 13/167 345/8 |
| 2016/0224750 A1 | 8/2016 | Kethman et al. | |
| 2017/0164878 A1 | 6/2017 | Connor | |
| 2017/0312614 A1 * | 11/2017 | Tran | A61B 5/11 |
| 2019/0339468 A1 | 11/2019 | Evans | |
| 2019/0342009 A1 | 11/2019 | Evans | |
| 2020/0152615 A1 | 5/2020 | Krasulick et al. | |
| 2020/0244045 A1 | 7/2020 | Bismuto et al. | |
| 2020/0253547 A1 | 8/2020 | Harris et al. | |
| 2020/0309593 A1 | 10/2020 | Bismuto et al. | |
| 2021/0033805 A1 | 2/2021 | Bishop et al. | |

FOREIGN PATENT DOCUMENTS

| | | |
|---|---|---|
| JP | 2008262118 | 10/2008 |
| WO | WO 01/014929 | 3/2001 |
| WO | WO 04/031824 | 4/2004 |
| WO | WO 05/091036 | 9/2005 |
| WO | WO 11/090274 | 7/2011 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 20/106974 | 5/2020 |

OTHER PUBLICATIONS

Milanovic et al., Compact MEMS Mirror Based Q-Switch Module for Pulse-on-demand Laser Range Finders, Presented at SPIE Conference on MOEMS and Miniaturized Systems XIV, San Francisco, CA Feb. 11, 2015. (Year: 2015).*

Schiappelli et al., Efficient fiber-to-waveguide coupling by a lens on the end of the optical fiber fabricated by focused ion beam milling, Microelectronic Engineering 73-74 (2004) 397-404 (Year: 2004).*

Tsai et al., A laminate cantilever waveguide optical switch. Proceedings—Electronic Components and Technology Conference. 203-207. 10.1109/ECTC.2012.6248828. (2012). (Year: 2012).*

Urey et al., MEMS laser scanners: a review. Journal of Microelectromechanical Systems. 23. 259. 10.1109/JMEMS.2013. 2295470. (2014). (Year: 2014).*

Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.

Kybartas et al., "Capacitive Sensor for Respiratory Monitoring," Conference "Biomedical Engineering," Nov. 2015, 6 pages.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Worhoff et al., "Flip-chip assembly for photonic circuits," MESA+ Research Institute, University of Twente, Integrated Optical MicroSystems Group, The Netherlands, 12 pages.

* cited by examiner

CANTILEVER BEAM WAVEGUIDE FOR SILICON PHOTONICS DEVICE

CROSS-REFERENCE TO RELATED APPLICATION

This application is a nonprovisional of and claims the benefit under 35 U.S.C. 119(e) of U.S. Provisional Patent Application No. 62/906,595, filed Sep. 26, 2019, the contents of which are incorporated herein by reference as if fully disclosed herein.

FIELD

Embodiments relate generally to photonics waveguides for electronic devices. More particularly, the described embodiments relate to cantilever beam waveguides for steering beams of light in a silicon photonics device.

BACKGROUND

Optical sensing systems may include silicon photonics devices, and in many cases the silicon photonics devices may be implemented as a silicon chip in order to provide a compact, space-efficient package. However, adjusting the direction of a beam of light outputted from the silicon photonics device requires performing complex calibration processes and/or including relatively large components in the silicon photonics device. Such calibration is particularly difficult for a system implemented in silicon photonics (e.g., as a silicon chip), and may be nearly impossible after the silicon photonics chip is installed in an electronic device.

SUMMARY

Embodiments of the systems, devices, methods, and apparatuses described in the present disclosure are directed to reluctance actuators configured to provide haptic outputs at electronic devices.

Embodiments described herein may include or take the form of a silicon photonics device that includes a silicon support layer, an oxide layer disposed above the silicon support layer and a silicon device layer disposed above the oxide layer. The oxide layer may define a gap. The silicon device layer may include a first electrode, a second electrode, and a cantilever beam waveguide. The cantilever beam waveguide may be positioned at least partially over the gap and between the first electrode and the second electrode. The cantilever beam waveguide may be configured to capacitively couple to the first electrode and the second electrode. The first electrode and the second electrode are configured to receive voltage signals that cause the cantilever beam waveguide to bend to selectively optically couple the cantilever beam waveguide with one or more additional components of the silicon photonics device.

Embodiments described herein may additionally or alternatively take the form of a silicon photonics device for an electronic device that includes a cantilever beam waveguide formed in a silicon device layer and configured to optically couple with a component of the silicon photonics device. The silicon photonics device may further include a first comb drive formed in the silicon device layer and coupled to a first side of the cantilever beam waveguide and a second comb drive formed in the silicon device layer and coupled to a second side of the cantilever beam waveguide opposite the first side. The first comb drive and the second comb drive may be configured to receive voltage signals to actuate the first comb drive and the second comb drive to cause the cantilever beam waveguide to oscillate at a resonant frequency of the cantilever beam waveguide. In a first bending configuration of the cantilever beam waveguide during oscillation, the cantilever beam waveguide is optically coupled to the component of the silicon photonics device. In a second bending configuration of the cantilever beam waveguide during oscillation, the cantilever beam waveguide is not optically coupled to the component of the silicon photonics device.

Embodiments described herein may additionally or alternatively take the form of an electronic device that includes a silicon photonics device including a first electrode a second electrode and a cantilever beam waveguide positioned between the first electrode and the second electrode and configured to bend to selectively align with one or more additional components of the silicon photonics device. The electronic device may further include a processing unit configured to cause voltage signals to be applied to the first electrode and the second electrode to cause the cantilever beam waveguide to bend.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
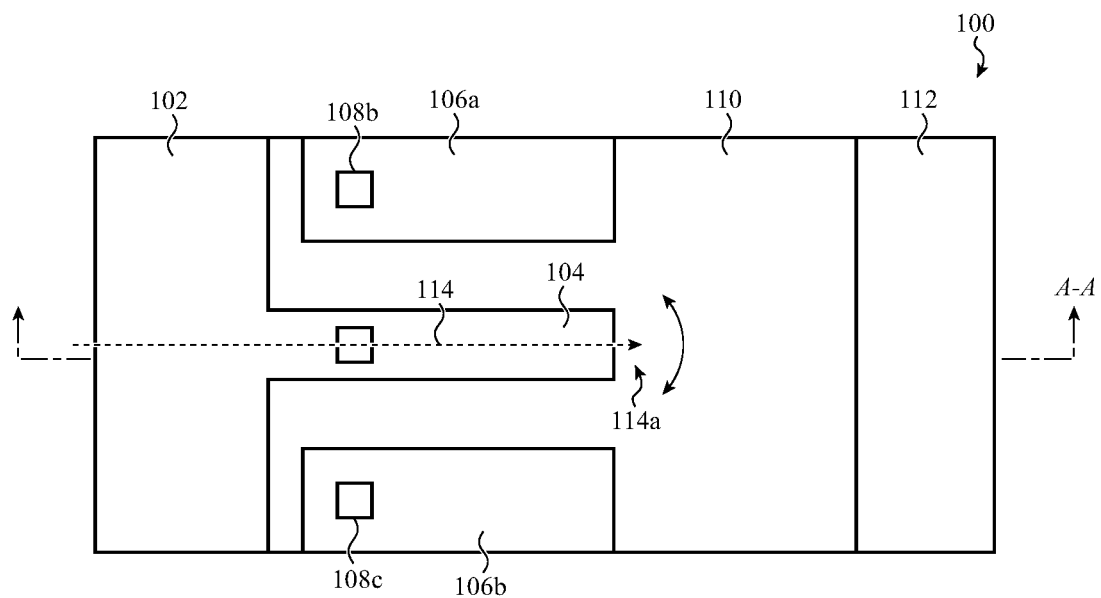
FIGS. 1A-1C illustrate an example silicon photonics device that includes a cantilever beam waveguide.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to a cantilever beam waveguide implemented in, or as part of, a silicon photonics device. The cantilever beam waveguide may be formed in a device layer (e.g., a silicon device layer) of a silicon photonics device (e.g., a chip) and may be configured to bend to align the cantilever beam waveguide or a portion thereof with one or more additional components of the silicon photonics device or another device, including output couplers, optical sources, and waveguides. The silicon photonics device may additionally or alternatively include a support layer (e.g., a silicon support layer) positioned beneath the device layer and/or an oxide layer (e.g., a silicon dioxide layer) positioned between the device layer and the support layer.

The cantilever beam waveguide may adjust a direction of light propagating out of an output of the cantilever beam waveguide, for example to direct the light toward one or more additional components. Additionally or alternatively, the cantilever beam waveguide may bend to receive light propagating from one or more additional components. Additionally or alternatively, the cantilever beam waveguide may be configured to bend to modulate light produced by a gain component between an on state in which light is produced and an off state in which light is not produced. The cantilever beam waveguide may be used to perform or facilitate a wide variety of functions, including optical scanning, switching, on/off modulation, calibration, and the like.

The cantilever beam waveguide may be capacitively coupled to one or more electrodes formed in the device layer. Bending the cantilever beam waveguide may be accomplished by changing the capacitance(s) between the cantilever beam waveguide and the one or more electrodes. For example, as the capacitance between an electrode and the waveguide increases, the cantilever beam waveguide may bend toward the electrode, and as the capacitance decreases, the cantilever beam waveguide may bend away from the electrode. A silicon photonics device may include two electrodes, one on each opposing side of the cantilever beam waveguide, to which voltage may be applied in order to change capacitance between a respective electrode and the waveguide. This, in turn, causes the waveguide to bend towards the electrode to which the voltage is applied. The magnitude of the displacement or deflection (e.g., the "bending") may vary with the applied voltage at the electrode; accordingly, by applying greater voltages to an electrode, capacitance between the electrode and the cantilever beam waveguide increases, thereby bending the cantilever beam waveguide to a greater degree toward that electrode. Some embodiments may bend the cantilever beam waveguide repeatedly in order to oscillate it at its resonant frequency. Alternating-current (AC) voltage signals at a resonant frequency of the cantilever beam waveguide and 180-degrees out of phase with one another may be applied to each electrode to cause oscillation of the cantilever beam waveguide at its resonant frequency. Applying voltage signals at the resonant frequency of the cantilever beam waveguide may significantly reduce the amount of energy required to oscillate the cantilever beam waveguide, because the cantilever beam waveguide oscillates at the resonant frequency, resulting in less energy lost during oscillation compared to non-resonant frequencies.

In some cases, bending of a waveguide is achieved using comb drives. Comb drives may be formed in one or more electrodes' device layers and positioned on opposite sides of the waveguide. These comb drives may be used to bend and/or oscillate the waveguide in a manner similar to the electrodes discussed above. Using comb drives may allow the waveguide to achieve greater displacement for the same amount of voltage input to the system.

At least a part of the cantilever beam waveguide may be positioned over a gap to formed in the silicon photonics device. The gap may be formed in the device layer or another layer of the silicon photonics device, such as an oxide layer. The silicon photonics device may include one or more additional layers, such as a support layer (e.g., a silicon support layer), cladding, coatings, and the like.

In some cases, the silicon photonics device may include one or more optical components for amplifying, receiving, propagating, redirecting, or otherwise handling light. The silicon photonics device may include an output coupler for redirecting at least a portion of the light propagating through the cantilever beam waveguide. The cantilever beam waveguide may adjust the direction of the light propagating therethrough in order to align this light with the output coupler, thereby achieving better transmission of light via the output coupler than if the cantilever beam waveguide was misaligned or partially misaligned with the output coupler. In some cases, the silicon photonics device may include multiple output couplers, and different bending amounts of the cantilever beam waveguide may cause the cantilever beam waveguide to be aligned with different output couplers. For example, when the cantilever beam waveguide is bent (e.g., deflected or otherwise displaced) a first amount, it may be aligned with a first output coupler. When the cantilever beam waveguide is bent a second amount, it may be aligned with a second output coupler. In this manner, the cantilever beam waveguide may be optically coupled to any of a number of output couplers depending on the amount of bending of the cantilever beam waveguide.

The output coupler may redirect light propagating through the cantilever beam waveguide toward a system interface (e.g., toward one or more additional components of an electronic device that includes the silicon photonics device, toward a user, or elsewhere). In some cases, the output coupler is formed as part of the cantilever beam waveguide and/or formed on one or more surface of the cantilever beam waveguide. In some cases, the output coupler is separate from the cantilever beam waveguide. For example, the output coupler may be formed in another region of the device layer. The output coupler may be a tilted mirror formed on or bonded to a surface of the device layer. For example the output coupler may be formed on a surface of the device layer using wet-etching or bonded to a surface of the device layer using laser bonding.

The silicon photonics device may include a gain component, such as a semiconductor wafer formed at least partially from group III-V semiconductor materials, examples of which include indium(III) phosphide or gallium(III) arsenide. The gain component may emit light in response to being excited by electrical current or light. The cantilever beam waveguide may include or define a mirror that cooperates with a mirror on or near a surface of the gain medium to create a laser cavity. In some cases, the mirror of the cantilever beam waveguide includes grating or other features to eliminate light at unwanted frequencies. As noted above, the cantilever beam waveguide may modulate a beam of light produced within the laser cavity formed between the mirrors between an off state in which no light beam is produced and an on state in which a light beam is produced by moving the mirror of the cantilever beam waveguide into and out of alignment with the mirror of the gain component.

The silicon photonics device may include one or more additional optical components, such as lenses, filters, collimators, and the like. The silicon photonics device may include optical components positioned to receive light output by an output coupler. The cantilever beam waveguide may include or be optically coupled to one or more lenses configured to focus light entering or leaving the cantilever beam waveguide. Some embodiments may be coupled, optically, physically, and/or electrically, to one or more of any of the foregoing elements.

The silicon photonics devices described herein may be used in an electronic device. The electronic device may in some cases take the form of any suitable electronic device, including a smartphone, an electronic watch, a tablet, a desktop computer, a laptop, an automobile, a gaming device, a digital music player, a wearable audio device, a device that provides time, a health assistant, and other types of electronic devices that include, or can be connected to a silicon photonics device. The silicon photonics devices described herein may be configured to perform any of a variety of functions using one or more electronic devices, including, but not limited to, a range-finder, depth finder, (or other distance measurement tool) for a smartphone or other electronic device, a light source for a laser, as part of a photoplethysmogram (PPG) sensor, a light source and/or sensor for time-of-flight distance measurement, a light sensor, and the like.

The term "attached," as used herein, may be used to refer to two or more elements, structures, objects, components, parts or the like that are physically affixed, fastened, and/or retained to one another. The term "coupled," as used herein, may be used to refer to two or more elements, structures, objects, components, parts or the like that are physically attached to one another, operate with one another, communicate with one another, are in electrical connection with one another, and/or otherwise interact with one another. Accordingly, while elements attached to one another are coupled to one another, the reverse is not required. As used herein, "operably coupled" or "electrically coupled" may be used to refer to two or more devices that are coupled in any suitable manner for operation and/or communication, including wiredly, wirelessly, or some combination thereof. As used herein, "optically coupled" may be used to refer to two or more components that are coupled in any suitable manner for providing an optical path between the components.

These and other embodiments are discussed with reference to FIGS. 1A-11. However, those skilled in the art will readily appreciate that the detailed description given herein with respect to these figures is for explanatory purposes only and should not be construed as limiting.

FIG. 1A illustrates an example silicon photonics device 100 that includes a cantilever beam waveguide 104. As noted above, light 114 may propagate through the cantilever beam waveguide 104. The cantilever beam waveguide 104 may bend in order to direct light 114 toward one or more additional components of the silicon photonics device 100.

As described in more detail with respect to FIG. 1D below, the silicon photonics device 100 may have multiple layers, including a support layer (e.g., a substrate formed of silicon or another suitable material), an oxide layer, and a device layer 102. The oxide layer may be used for passivation of the device layer 102 and/or the support layer, and may be formed of any suitable material, including silicon dioxide. The oxide layer may define a gap beneath the cantilever beam waveguide that may allow the cantilever beam waveguide to bend. In some cases, the support layer may be disposed beneath the device layer, and the oxide layer may be disposed between the support layer and the device layer.

Figure 1B:
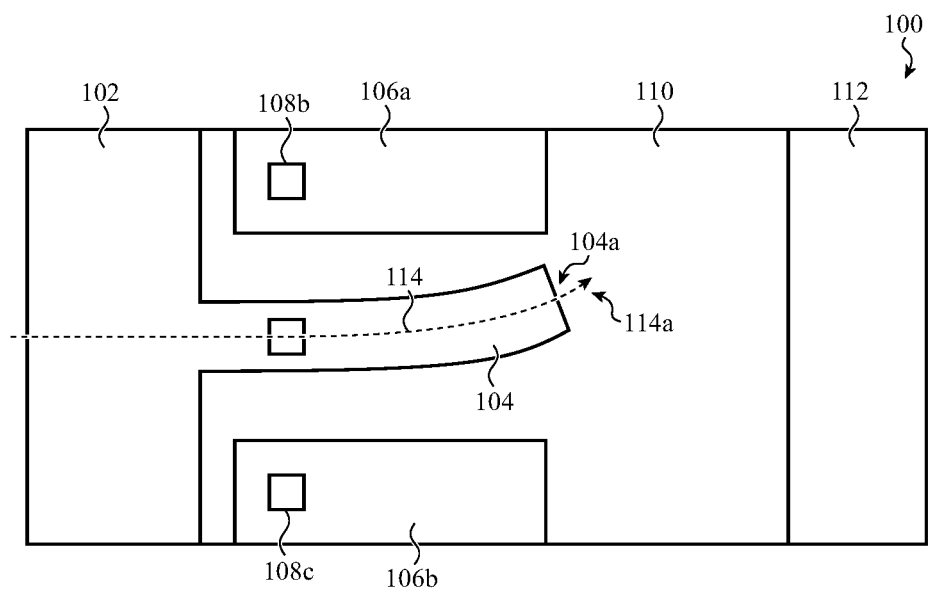
Figure 1C:
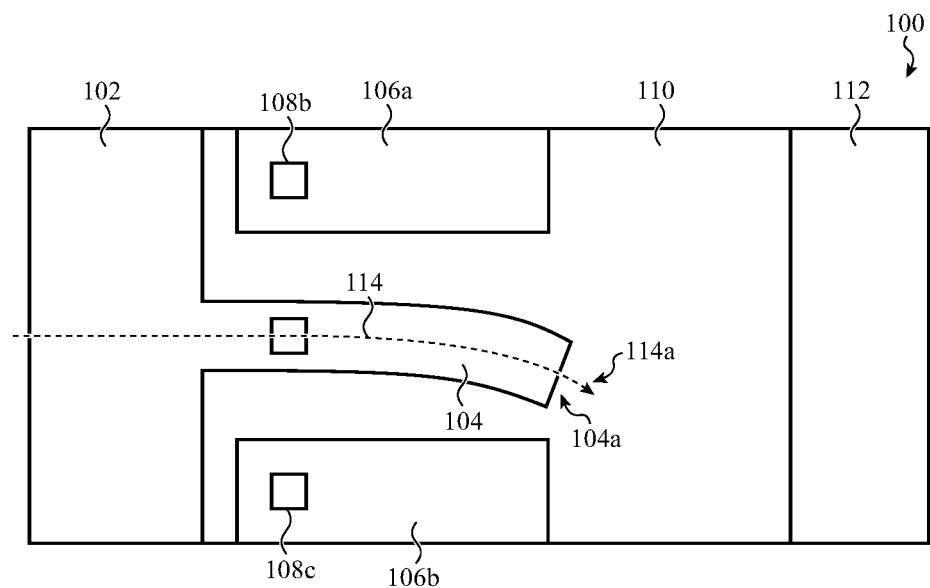

As noted above, the cantilever beam waveguide 104 may be formed in a device layer 102, and the silicon photonics device 100 may include one or more electrodes 106a, 106b formed in the device layer 102. The electrodes 106a, 106b may be positioned on opposite sides of the cantilever beam waveguide 104 and configured to capacitively couple with the cantilever beam waveguide. The capacitance between an electrode 106a, 106b and the cantilever beam waveguide 104 may cause a portion of the cantilever beam waveguide 104 to move toward the electrode, thereby causing the cantilever beam waveguide 104 to bend, as shown in FIGS. 1B and 1C. The cantilever beam waveguide 104 may bend to adjust a direction 114a of the light 114 propagating out of an output 104a of the cantilever beam waveguide, for example to direct the light 114 toward one or more additional components (e.g., a component in a region 112 of the device layer 102 or another component).

The electrodes 106a, 106b may be electrically coupled to voltage sources (not shown in FIG. 1A) via contacts 108b, 108c. The cantilever beam waveguide 104 may be electrically coupled to a common node (e.g., ground) via a contact 108a to form a capacitive coupling between each electrode 106a, 106b and the cantilever beam waveguide 104. Additionally or alternatively, the cantilever beam waveguide 104 may float or have its own non-ground voltage. The voltage sources may provide voltage signals to the electrodes 106a, 106b to change the capacitances between each electrode 106a, 106b and the cantilever beam waveguide 104 in order to bend the cantilever beam waveguide. In some cases, the voltage signals include alternating-current (AC) voltage signals having a frequency at a multiple of a resonant frequency of the cantilever beam waveguide 104, and 180-degrees out of phase with one another. This may cause the cantilever beam waveguide 104 to oscillate at the resonant frequency.

A first AC voltage signal may be applied to the electrode 106a, and a maximum voltage of the sinusoidal voltage signal may occur at a first time. The maximum voltage may result in a highest value of capacitance between the electrode 106a and the cantilever beam waveguide 104. If a similar, but out-of-phase, second AC voltage signal is applied to the electrode 106b, the a sinusoidal voltage signal may have a minimum voltage at the first time, which may result in a lowest value of capacitance between the electrode 106b and the cantilever beam waveguide 104. As a result, the electrode 106a will exert a force on the cantilever beam waveguide 104 to pull the cantilever beam waveguide toward the electrode 106a, such as shown in FIG. 1B. Similarly, at a second time in which the first voltage signal has a minimum voltage and the second voltage signal has a maximum voltage, the electrode 106b will exert a force on the cantilever beam waveguide to pull the cantilever beam waveguide toward the electrode 106b, such as shown in FIG. 1C.

If the first and second AC voltage signals each have a frequency at a multiple of the resonant frequency of the cantilever beam waveguide 104, the cantilever beam waveguide will resonate (e.g., oscillate at a multiple of the resonant frequency). Applying voltage signals at the resonant frequency of the cantilever beam waveguide 104 may significantly reduce the amount of energy required to oscillate the cantilever beam waveguide. Generally, the first and second AC voltage signals need only overcome the damping forces acting on the cantilever beam waveguide to maintain the oscillation. The energy required to overcome the damping forces is typically less than the energy required to oscillate the cantilever beam waveguide at a frequency that is not a multiple of the resonant frequency. As a result, oscillating the cantilever beam waveguide at the resonant frequency may result in less power consumption of the photonics device 100, thereby improving its power efficiency and/or the power efficiency of a device in which it is placed.

Figure 1D:
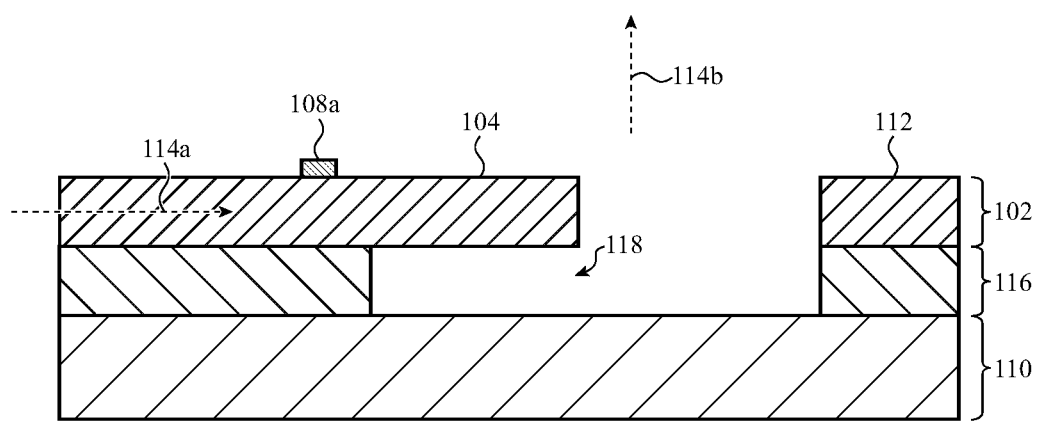
FIG. 1D illustrates a cross-section view of the example silicon photonics device of FIG. 1A, taken through section line A-A of FIG. 1A.

FIG. 1D illustrates a cross-section view of the example silicon photonics device 100 of FIG. 1A, taken through section line A-A of FIG. 1A. In various embodiments, the silicon photonics device 100 is configured to output light in a direction 114b that is substantially perpendicular to the path of travel 114a of the light propagating through the cantilever beam waveguide. The silicon photonics device 100 may include optical components, such as one or more output couplers for directing light in the direction 114b.

As shown in FIG. 1D, the silicon photonics device 100 may have multiple layers, including a support layer 110 (e.g., a substrate formed of silicon or another suitable material), an oxide layer 116, and the device layer 102. The oxide layer 116 may be used for passivation of the device layer 102 and/or the support layer 110, and may be formed of any suitable material, including silicon dioxide. The oxide layer 116 may define a gap 118 beneath the cantilever beam waveguide 104 that may allow the cantilever beam waveguide to bend. The gap 118 may be formed by etching the oxide layer 116. The cantilever beam waveguide may bend along one axis or along multiple axes. For example, the cantilever beam waveguide 104 may bend into and out of the page with respect to FIG. 1D, as shown and described with respect to FIGS. 1A-1C, and/or up and down with respect to FIG. 1D, as described in more detail below with respect to FIG. 10.

The light 114 shown in FIGS. 1A-1D is output by the free end of the cantilever beam waveguide 104. Further, the light 114 propagating out of the cantilever beam waveguide 104 may be directed toward one or more additional components using the cantilever beam waveguide. Additionally or alternatively, light may be received at the free end of the cantilever beam waveguide and travel in an opposite direction from the light 114 shown in FIGS. 1A-1D. For example, the cantilever beam waveguide 104 may be configured to bend to receive light (e.g., light propagating from one or more additional components) at the free end of the cantilever beam waveguide.

The cantilever beam waveguide 104, the electrodes 106a, 106b, and other components formed in the device layer 102 or other layers of the silicon photonics device 100 may be formed using any of a variety of techniques and methods. In some cases, the cantilever beam waveguide 104 and/or the electrodes 106a, 106b are formed by etching the device layer 102. In some cases, a cantilever portion of the cantilever beam waveguide 104 has a length between 100 and 1000 microns. In some cases, the cantilever portion of the cantilever beam waveguide has a length between 250 and 400 microns. The cantilever beam waveguide 104 may have a width between 0.1 and 3 microns. The cantilever beam waveguide 104 may have a width between 0.2 and 0.5 microns. A cantilever beam waveguide 104 having dimensions as listed herein may be especially useful when incorporated into portable electronic devices where internal space is at a premium.

Figure 2A:
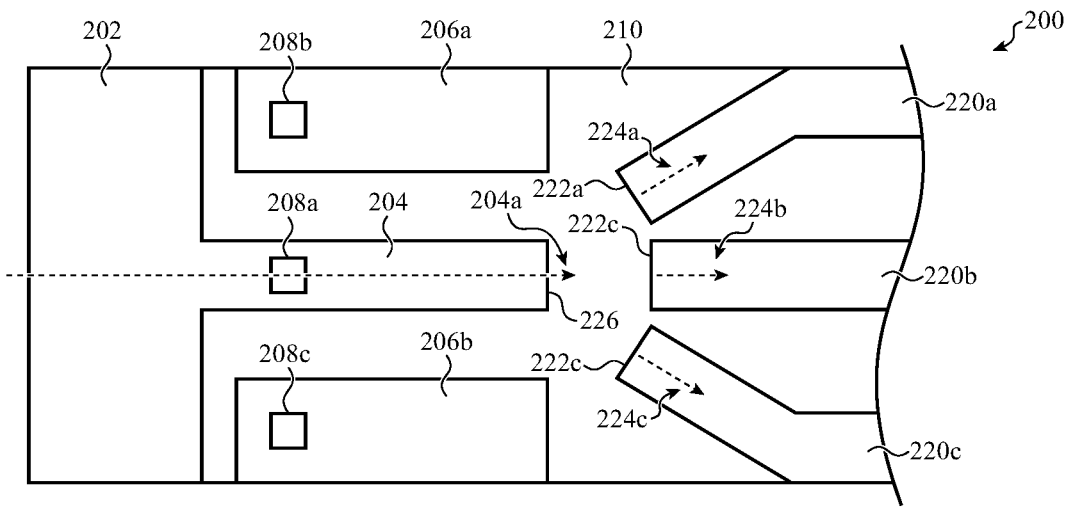
FIGS. 2A-2C illustrate a silicon photonics device that includes a cantilever beam waveguide that is configured to bend to selectively align with multiple waveguides of the silicon photonics device.
Figure 2B:
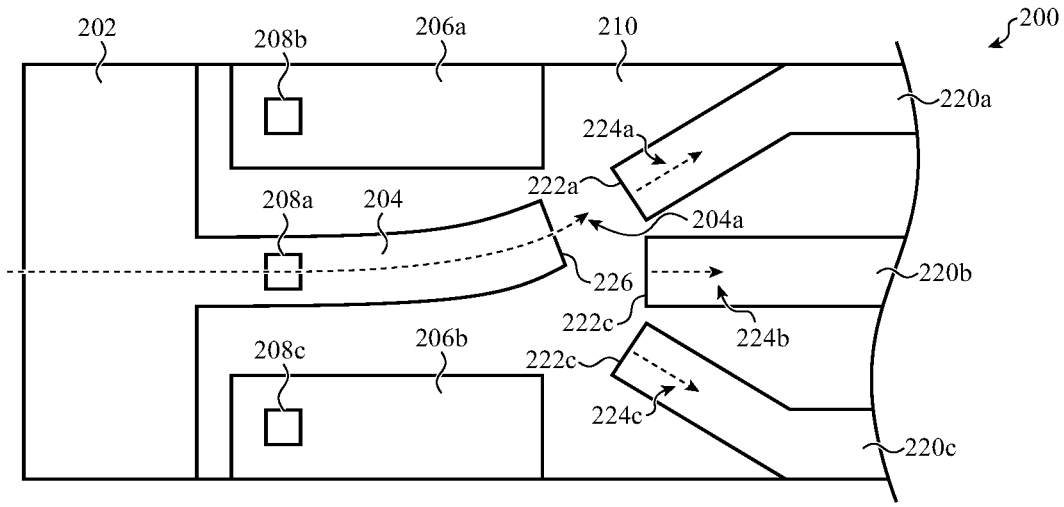
Figure 2C:
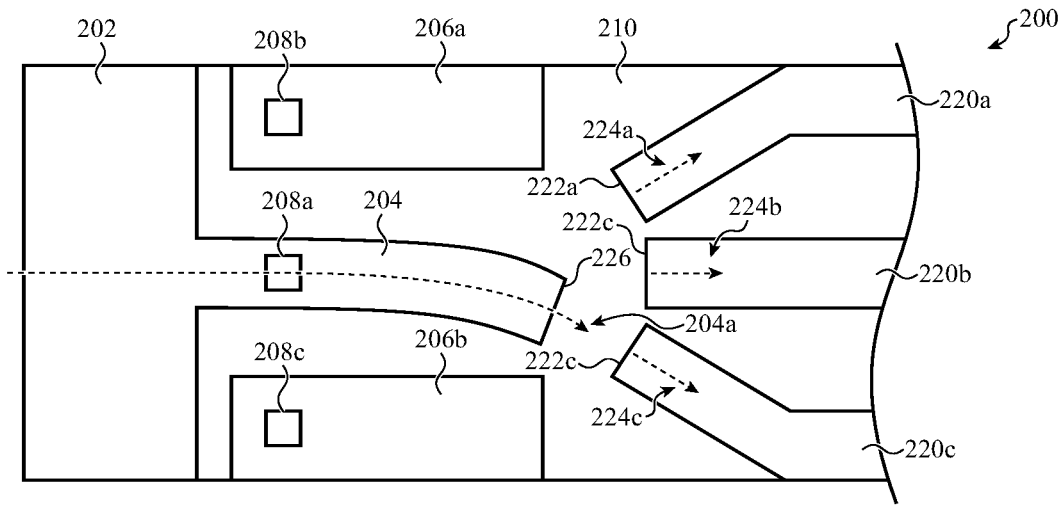

As noted above, a cantilever beam waveguide may bend to align at least a portion of the cantilever waveguide with one or more additional components of the silicon photonics device. FIGS. 2A-2C illustrate a silicon photonics device 200 that includes a cantilever beam waveguide 204 that is configured to bend to selectively align with multiple waveguides 220a, 220b, 220c of the silicon photonics device. The waveguides 220a-c may be formed in a device layer 202 of the silicon photonics device 200. The waveguides 220a-c may be arranged in an array, and each waveguide 220a-c may be selectively aligned with the cantilever beam waveguide 204 depending on the bending configuration of the cantilever beam waveguide. When a waveguide 220a-c is aligned with the cantilever beam waveguide 204, the waveguide and the cantilever beam waveguide may be optically coupled. The cantilever beam waveguide 204 may be configured to move similarly to the cantilever beam waveguide 104 described above.

In a first bending configuration of the cantilever beam waveguide 204, (e.g., a non-bended configuration as shown in FIG. 2A), an output path 204a of the cantilever beam waveguide 204 (e.g., a direction of light propagating out of an output of the cantilever beam waveguide) may be optically coupled with the waveguide 220b (e.g., aligned with an input path 224b of the waveguide 220b). Said another way, the light propagating out of the output of the cantilever beam waveguide 204 may be directed toward the input path 224b of the waveguide 220b such that the light enters and propagates through the waveguide 220b.

In a second bending configuration of the cantilever beam waveguide 204, (e.g., a bended configuration as shown in FIG. 2B), the output path 204a of the cantilever beam waveguide 204 may be optically coupled with the waveguide 220a (e.g., aligned with an input path 224a of the waveguide 220a). Said another way, the light propagating out of the output of the cantilever beam waveguide 204 may be directed toward the input path 224a of the waveguide 220a such that the light enters and propagates through the waveguide 220a.

In a third bending configuration of the cantilever beam waveguide 204, (e.g., a bended configuration as shown in FIG. 2C), the output path 204a of the cantilever beam waveguide 204 may be optically coupled with the waveguide 220c (e.g., aligned with an input path 224c of the waveguide 220c). Said another way, the light propagating out of the output of the cantilever beam waveguide 204 may be directed toward the input path 224c of the waveguide 220c such that the light enters and propagates through the waveguide 220c.

The cantilever beam waveguide 204 may transition between various bending configurations by bending as discussed herein. As shown in FIGS. 2A-2C, the input surfaces 222a-c of the waveguides 220a, 220b, 220c are not parallel with one another, but instead positioned at angular offsets from one another such that when the cantilever beam waveguide 204 is aligned with a waveguide 220a-c, the input surface 222a-c of the waveguide is facing the cantilever beam waveguide 204 (e.g., parallel to an output surface 226 of the cantilever beam waveguide).

The silicon photonics device 200 may be similar to the silicon photonics device 100 described above with respect to FIGS. 1A-1D, and may include similar functionality and/or components, including a device layer 202, a support layer 210, electrodes 206a-b, and contacts 208a-c. In the example of FIGS. 2A-2C, the cantilever beam waveguide 204 bends to selectively align with waveguides 220a-c. In various embodiments, the cantilever beam waveguide 204 may bend to align with any number of device components, including gain components, output couplers, optical components, and the like. In various embodiments, the cantilever beam waveguide 204 may be configured to align with any number of waveguides and/or other device components. In the example of FIGS. 2A-2C, light passes from the cantilever beam waveguide 204 to the waveguides 220a-c. In various embodiments, light may pass in an opposite direction (e.g., from the waveguides 220a-c or other components into the cantilever beam waveguide 204).

Figure 3:
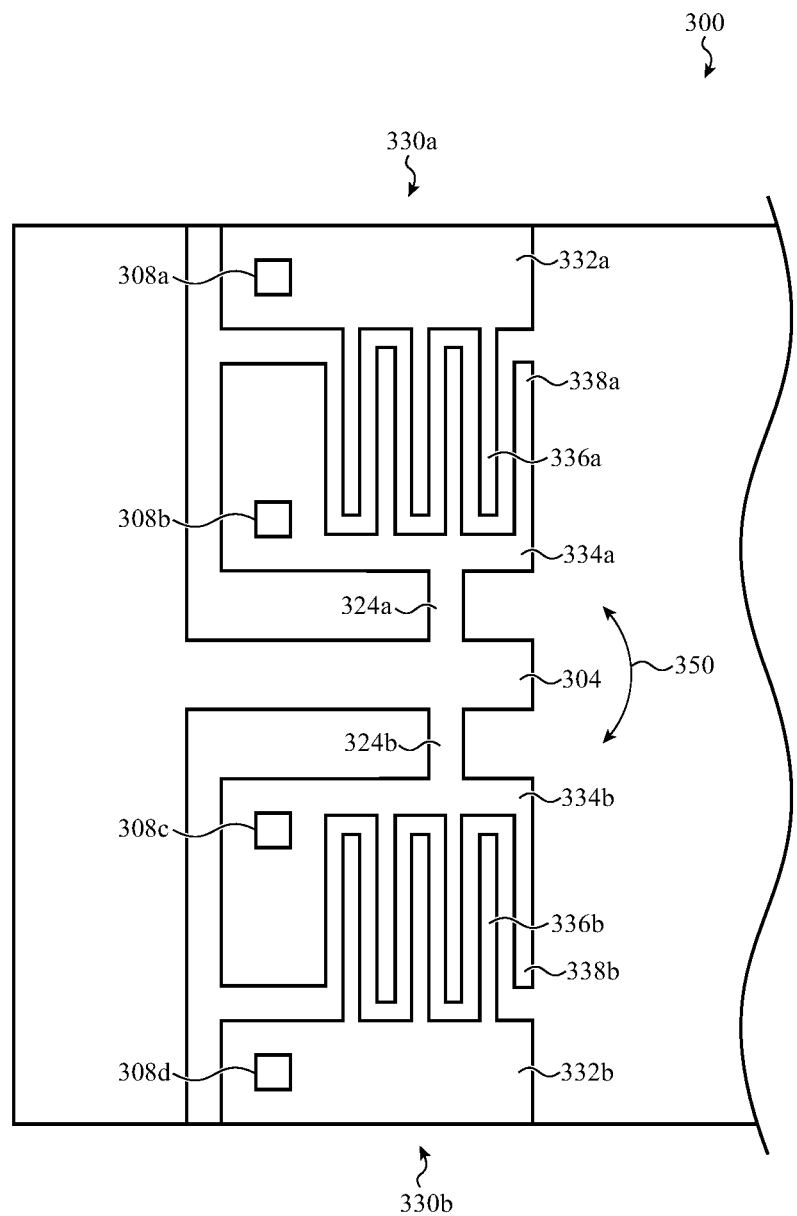
FIG. 3 illustrates an example silicon photonics device that includes comb drives coupled to a beam waveguide and configured to cause the beam waveguide to bend.

As noted above, in some cases, bending of a waveguide is achieved using comb drives. FIGS. 3-6 illustrate example silicon photonics devices that include comb drives to bend a beam waveguide. FIG. 3 illustrates an example silicon photonics device 300 that includes comb drives 330a and 330b coupled to a beam waveguide 304 and configured to cause the beam waveguide 304 to bend. The comb drives 330a, 330b and the beam waveguide 304 may be formed in a single device layer. The comb drives 330a, 330b may be formed in and/or define one or more electrodes of the silicon photonics device 300. As shown in FIG. 3, the comb drives 330a, 330b may be positioned on opposite sides of the beam waveguide 304.

The comb drives 330a, 330b may consist of two interdigitated comb-shaped members 332a-b and 334a-b that are configured to move toward one another in response to a capacitance generated between the comb-shaped members by applying voltage signals to the comb-shaped members. As used herein, "interdigitated" refers to an arrangement of two comb-shaped members in which teeth of a first comb-shaped member are positioned in gaps defined by teeth of a second comb-shaped member, and vice versa. Each comb-shaped member 332a-b and 334a-b may include a set of teeth 336a-b and 338a-b. Voltage signals may be applied to the comb-shaped members 332a-b and 334a-b, for example via contacts 308a-d, to cause each comb drive 330a, 330b to actuate by the respective comb-shaped members being drawn toward one another. Applying a voltage to a comb-shaped member 332, 334 (e.g., applying a voltage to a contact 308a-d) may apply the same voltage to each tooth of the set of teeth of the comb-shaped member, which establishes a set of capacitances with respect to the interdigitated teeth. This causes the comb-shaped members to be attracted to one another, which may cause the waveguide 304 to bend. This movement may translate into a larger degree of bending or displacement for the waveguide 304 than if the comb drives were not used.

The comb drives 330a, 330b may be coupled to the beam waveguide 304 by connectors 324a and 324b, respectively. As each comb drive 330a, 330b actuates, it may exert a pulling force on the beam waveguide 304 via the connectors 324a and 324b that causes the beam waveguide 304 to bend toward the comb drive 330a, 330b (as shown by arrows 350). The comb drives 330a, 330b may be actuated in an alternating pattern to cause the beam waveguide 304 to oscillate, for example at a resonant frequency of the beam waveguide 304.

As noted above, using comb drives may allow the cantilever beam waveguide to achieve more displacement for the same amount of voltage input to the system. The beam waveguide 304 may be used to direct light in any of the ways discussed or envisioned herein. In some cases, the comb drives 330a, 330b, the connectors 324a, 324b, and the beam waveguide 304 are formed in the same device layer. The silicon photonics device 300 may be similar to the silicon photonics devices 100, 200 discussed herein, and may include similar functionality and/or components.

Figure 4:
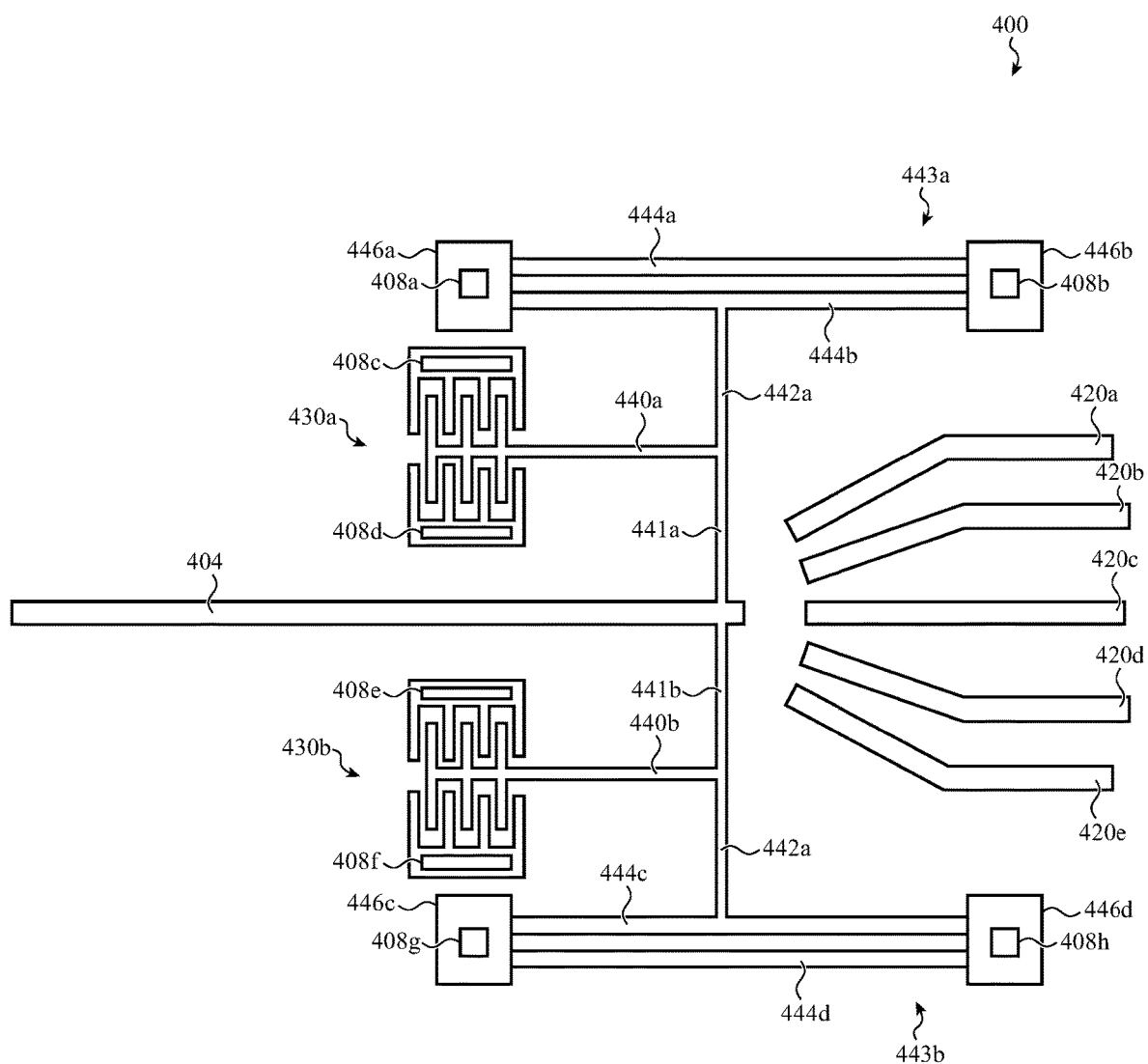
FIG. 4 illustrates an example silicon photonics device that includes comb drives coupled to a beam waveguide and configured to cause the beam waveguide to bend.

FIG. 4 illustrates an example silicon photonics device 400 that includes comb drives 430a and 430b coupled to a beam waveguide 404 and configured to cause the beam waveguide 404 to bend. The comb drives 430a-b may actuate similarly to the actuation of the comb drives 330a, 330b discussed above, for example in response to voltage signals applied via contacts 408c-f. Actuation of the comb drives 330a, b may cause the beam waveguide 404 to bend. The beam waveguide 404 may bend to selectively align with waveguides 420a-e to direct light towards (or receive light from) the waveguides, as discussed above with respect to FIGS. 2A-2C.

The comb drives 430a and 430b may be coupled to the beam waveguide 404 by connectors 440a-b and 441a-b. As shown in FIG. 4, the comb drive 430a may be coupled to the beam waveguide 404 by connectors 440a and 441a, and the comb drive 430b may be coupled to the beam waveguide 404 by connectors 440b and 441b. The beam waveguide 404 and the comb drives 430a and 430b may additionally be coupled to support structures 443a and 443b positioned on opposing sides of the beam waveguide 404, for example by connectors 442a and 442b. The support structures 443a and 443b may include support beams 444a-d extending between anchors 446a-d.

The support structures 443a and 443b may provide structural stability to the silicon photonics device 400. In some cases, the support structures 443a and 443b may be configured as microelectricalmechanical system (MEMS) springs for selectively exerting restoring force(s) on the beam waveguide 404. For example, the support structures 443a and 443b may be used to restore the beam waveguide 404 to a non-bended configuration shown in FIG. 4. Bending the beam waveguide 404 may cause the support beams 444a-d to bend in a direction corresponding to the bending of the beam waveguide. For example, as the waveguide bends upward with respect to FIG. 4, the support beams 444*a-d* may bend upward as well. When voltage is applied to the contacts 408*a-h*, the beams 444*a-d* may bend, thereby storing potential energy in the MEMS spring. When the voltage is reduced, the beams 444*a-d* may move toward a default position (e.g., all beams straight as shown in FIG. 4) that restores the beam waveguide 404 to the non-bended configuration.

The silicon photonics device 400 may be similar to the silicon photonics devices 100, 200, 300 discussed herein, and may include similar functionality and/or components. The connectors, comb drives, support beams, anchors, and waveguides may be formed in a single device layer, such as the device layer 102 described with respect to FIGS. 1A-1D.

Figure 5:
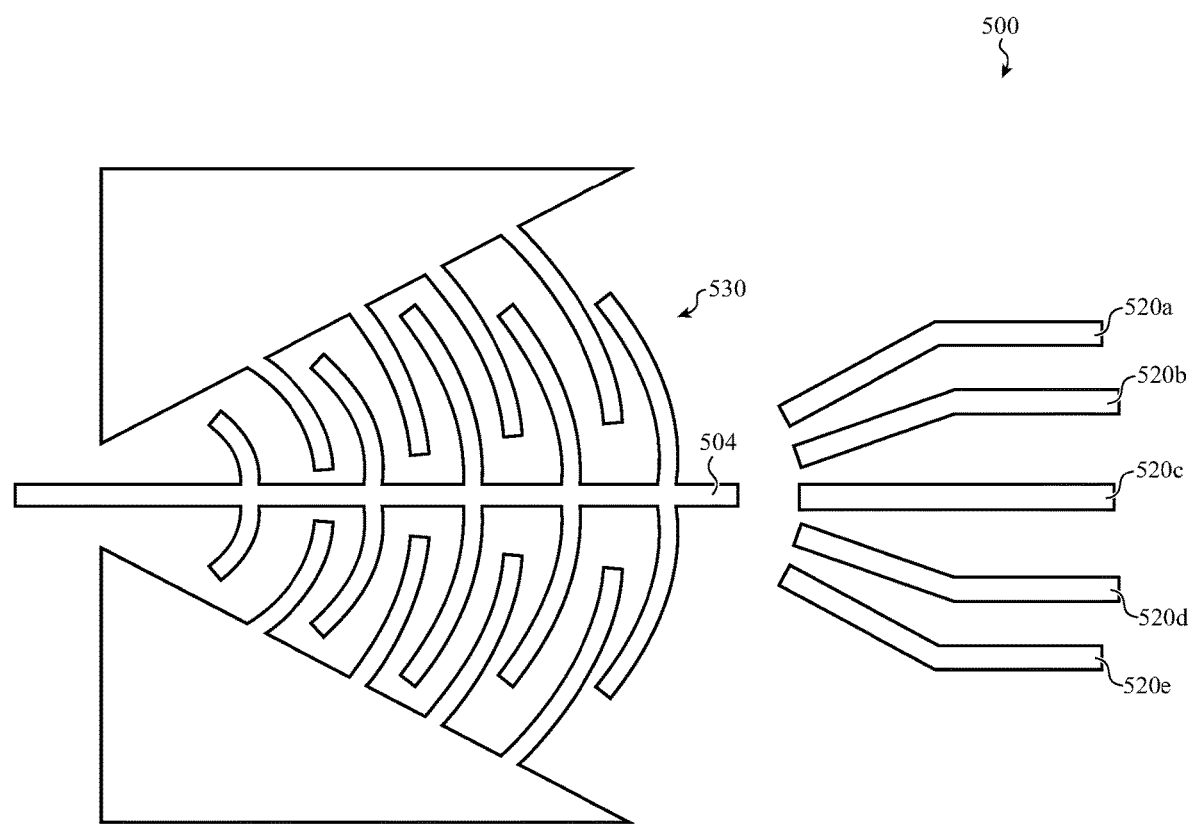
FIG. 5 illustrates an example silicon photonics device that includes a comb drive configured to cause a beam waveguide to bend to align with waveguides of the silicon photonics device.

FIG. 5 illustrates an example silicon photonics device 500 that includes a comb drive 530 configured to cause a beam waveguide 504 to bend to align with waveguides 520*a-e*. The silicon photonics device 500 may be similar to the silicon photonics devices 100, 200, 300, 400 discussed herein, and may include similar functionality and/or components. The comb drive 530 and waveguides 504 and 520*a-e* may be formed in a single device layer, such as the device layer 102 described with respect to FIGS. 1A-1D.

As shown in FIG. 5, the comb drive may be configured as a radial comb drive. The radial comb drive structure may decrease the amount of energy necessary to bend the beam waveguide 504 compared to linear waveguides discussed with respect to FIGS. 3 and 4 and/or the electrode structure discussed above with respect to FIGS. 1A-1D. As shown in FIG. 5, the beam waveguide 504 may be integrated as part of the comb drive 530. For example, teeth of the comb drive 530 may extend from the beam waveguide 504.

Similar to the comb drives discussed above, voltages may be applied to the comb drive 530 to actuate the comb drive. Voltages may be applied to the interdigitated teeth of the comb drive 530 to establish a set of capacitances with respect to the interdigitated teeth. This causes the comb-shaped members to be attracted to one another, which may result in radial movement of the waveguide 504. This movement may translate into a larger degree of bending or displacement for the waveguide 504 than if the comb drive was not used.

Figure 6:
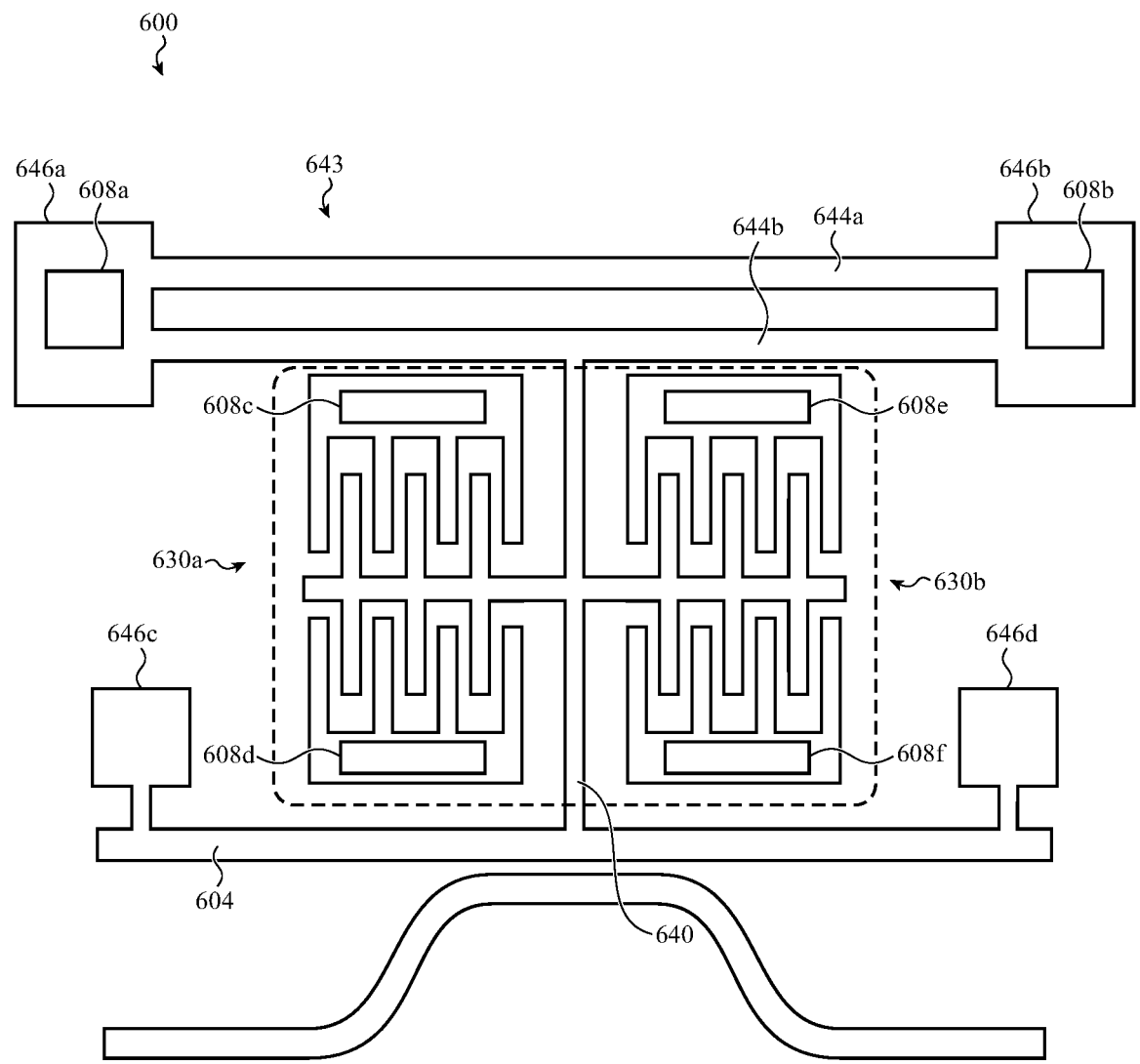
FIG. 6 illustrates an example silicon photonics device that includes comb drives configured to cause a beam waveguide to bend.

FIG. 6 illustrates an example silicon photonics device 600 that includes comb drives 630*a* and 630*b* configured to cause a beam waveguide 604 to bend. The silicon photonics device 600 may be similar to the silicon photonics devices 100, 200, 300, 400, 500 discussed herein, and may include similar functionality and/or components. The comb drive 630 and waveguide 604 may be formed in a single device layer, such as the device layer 102 described with respect to FIGS. 1A-1D. The beam waveguide 604 may be configured as a clamped-clamped beam that is fixed at two or more points. For example, as shown in FIG. 6, the beam waveguide 604 may be coupled to anchors 646*c* and 646*d* that fixes the beam waveguide at two locations.

The comb drives 630*a*, 630*b* may be coupled to the beam waveguide 304 by a connector 640. As each comb drive 630*a*, 630*b* actuates, for example in response to voltage signals applied via contacts 608*a-f*, it may exert a pulling force on the beam waveguide 604 via the connector 640 that causes the beam waveguide 604 to bend toward the comb drives 630*a*, 630*b*.

The beam waveguide 604 and the comb drives 630*a* and 630*b* may additionally be coupled to a support structure 643, for example by the connector 640. The support structure 643 may include support beams 644*a-b* extending between anchors 646*a-b*. Similar to the support structures discussed above with respect to FIG. 4, the support structure 643 may be configured as a MEMS spring for springs for selectively exerting restoring force(s) on the beam waveguide 604 to restore the beam waveguide 604 to a non-bended configuration. When voltage is applied to the contacts 608*a-f*, the beams 644*a-b* may bend, thereby storing potential energy in the MEMS spring. When the voltage is reduced, the beams 644*a-b* may move toward a default position (e.g., both beams straight as shown in FIG. 6) that restores the beam waveguide 604 to the non-bended configuration.

Figure 7:
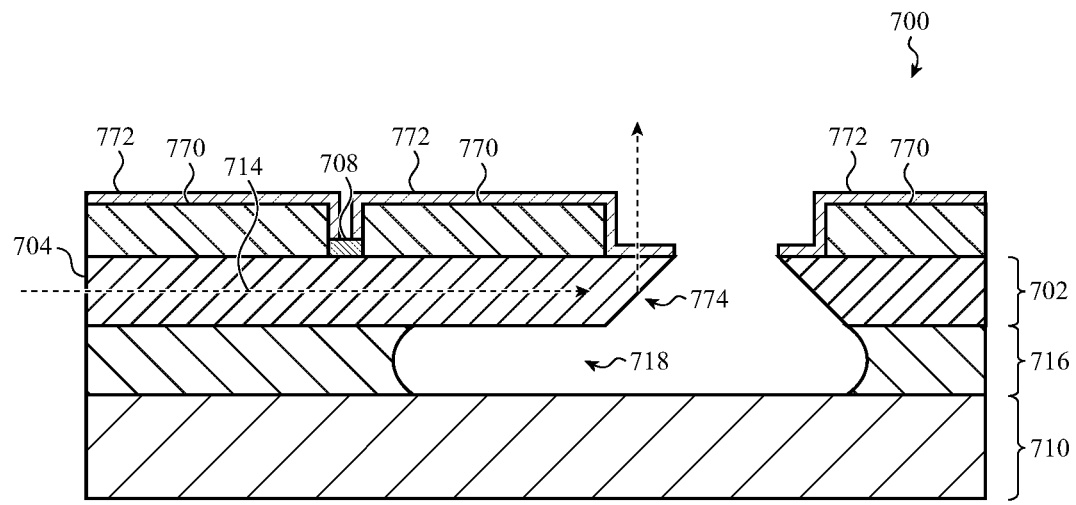
FIG. 7 illustrates a cross-section of an example silicon photonics device that includes an output coupler formed on an angled surface of a cantilever beam waveguide.

As noted above, the silicon photonics devices described herein may include optical components, such as output couplers. The output coupler may redirect light propagating through the cantilever beam waveguide toward a system interface (e.g., toward one or more additional components of an electronic device that includes the silicon photonics device, toward a user, or elsewhere). In some cases, an output coupler is formed as part of the cantilever beam waveguide and/or formed on one or more surface of the cantilever beam waveguide. FIG. 7 illustrates an example silicon photonics device 700 that includes an output coupler 774 formed on an angled surface of a cantilever beam waveguide 704. The silicon photonics device 700 may be similar to the silicon photonics devices 100, 200, 300, 400, 500, 600 discussed herein, and may include similar functionality and/or components. The silicon photonics device 700 may include the cantilever beam waveguide 704 formed in a device layer 702 and configured to receive voltage signals via a contact 708. The cantilever beam waveguide 704 may be formed over a gap 718 in an oxide layer 716 disposed over a support layer 710.

As shown in FIG. 7, the output coupler 774 may redirect at least a portion of the light 714 propagating through the cantilever beam waveguide 704 out of the silicon photonics device 700, for example toward a system interface or toward one or more additional components of the silicon photonics device 700. The output coupler 774 may be a tilted mirror formed on or bonded to a surface of the device layer. For example the output coupler 774 may be formed on a surface of the device layer 702 using wet-etching or bonded to a surface of the device layer 702 using laser bonding. The cantilever beam waveguide 704 may be configured to bend as described herein, for example to align the light redirected by the output coupler 774 with one or more additional components.

The silicon photonics device 700 may include one or more additional layers. The silicon photonics device 700 may include a cladding layer 770 disposed over the device layer 702 that confines the light 714 propagating through the cantilever beam waveguide 704. The cladding layer 770 may be formed of any suitable material or combination of materials, including oxide materials such as silicon dioxide. The silicon photonics device 700 may include a coating 772 disposed over the device layer 702 and/or the cladding layer 770. The coating 772 may have anti-reflective properties and/or be configured to insulate, passivate, or prevent the ingress of contaminants into other layers of the silicon photonics device 700. The coating 772 may be formed of any suitable material or combination of materials, including silicon nitride.

Figure 8:
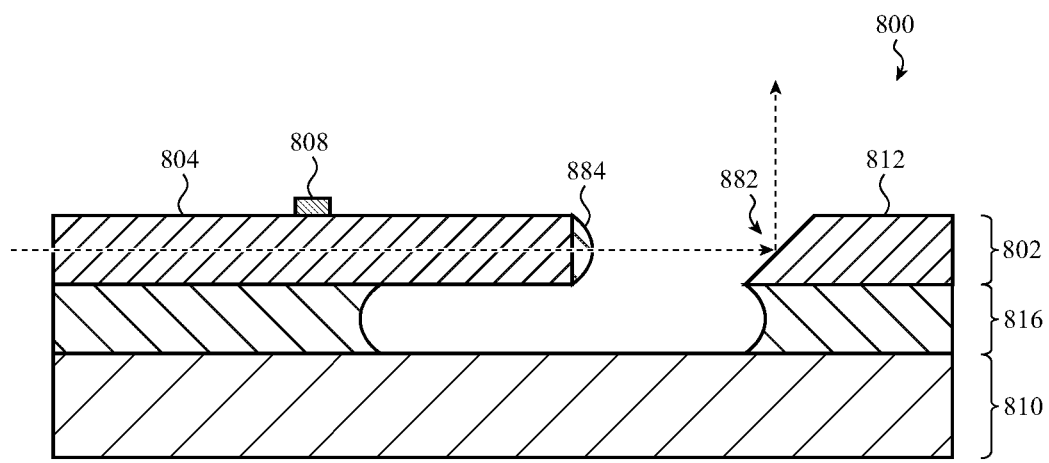
FIG. 8 illustrates a cross-section of an example silicon photonics device that includes a cantilever beam waveguide and an output coupler formed on a surface of a device layer.

In some cases, the output coupler is separate from the cantilever beam waveguide. For example, the output coupler may be formed in another region of the device layer. FIG. 8 illustrates an example silicon photonics device 800 that includes a cantilever beam waveguide 804 and an output coupler 882 formed on a surface of a device layer 802 in a region 812 of the device layer. The silicon photonics device 800 may be similar to the silicon photonics devices 100, 200, 300, 400, 500, 600, 700 discussed herein, and may include similar functionality and/or components. The silicon photonics device 800 may include the cantilever beam waveguide 804 formed in the device layer 802 and configured to receive voltage signals via a contact 808. The cantilever beam waveguide 804 may be formed over a gap in an oxide layer 816 disposed over a support layer 810.

As shown in FIG. 8, the output coupler 882 may redirect at least a portion of the light 814 propagating through the cantilever beam waveguide 804 out of the silicon photonics device 800, for example toward a system interface or toward one or more additional components of the silicon photonics device 800. The output coupler 882 may be a tilted mirror formed on or bonded to a surface of the device layer in a region 812 that is separate from the cantilever beam waveguide 804. For example the output coupler 882 may be formed on an angled surface of the device layer 802 using wet-etching or bonded to a surface of the device layer 802 using laser bonding. The cantilever beam waveguide 804 may be configured to bend as described herein, for example to align the cantilever beam waveguide 804 with one or more additional components, such as the output coupler 882 and/or to align the light 814 redirected by the output coupler 882 with one or more additional components.

The cantilever beam waveguide 804 may include or be optically coupled to one or more lenses configured to focus light entering or leaving the cantilever beam waveguide. For example, a lens 884 may be positioned at an end of the cantilever beam waveguide 804 and may be configured to focus light 814 exiting the cantilever beam waveguide 804 onto the output coupler 882. Additionally or alternatively, the lens 884 may be configured to focus light entering the cantilever beam waveguide 804.

Figure 9:
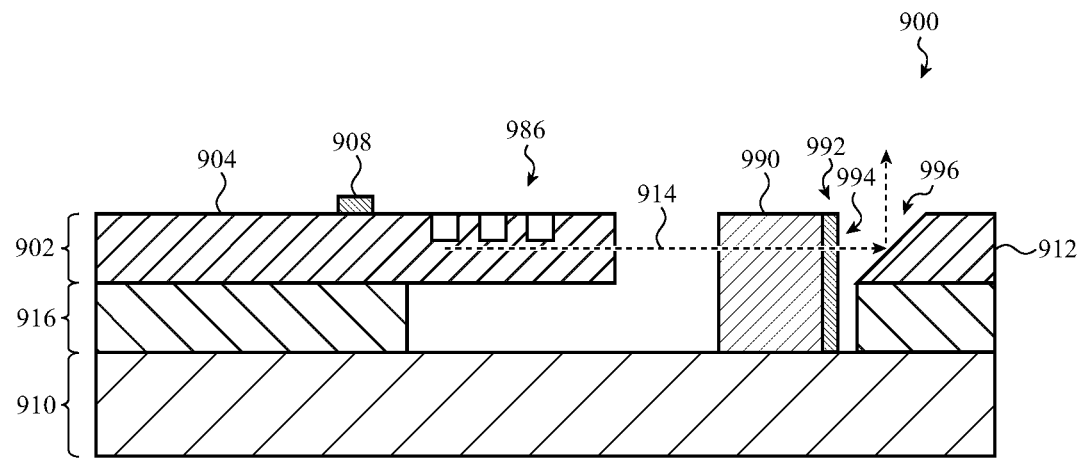
FIG. 9 illustrates a cross-section of an example silicon photonics device that includes a gain component and a cantilever beam waveguide configured to modulate a beam of light produced using the gain component.

As noted above, a silicon photonics device may include gain material for producing a beam of light (e.g., a laser beam), and a cantilever beam waveguide may be used to modulate the beam of light. FIG. 9 illustrates a silicon photonics device 900 that includes a gain component 990 and a cantilever beam waveguide 904 configured to modulate a beam of light 914 produced using the gain component 990. The silicon photonics device 900 may be similar to the silicon photonics devices 100, 200, 300, 400, 500, 600, 700, 800 discussed herein, and may include similar functionality and/or components. The silicon photonics device 900 may include the cantilever beam waveguide 904 formed in the device layer 902 and configured to receive voltage signals via a contact 908. The cantilever beam waveguide 904 may be formed over a gap in an oxide layer 916 disposed over a support layer 910. The gain component 990 may include a backside mirror 992 that defines an opening 994 for outputting at least a portion of the beam of light. The silicon photonics device 900 may further include an output coupler 996 positioned in a region 912 of the device layer and configured to redirect light, similar to the output couplers described herein.

The cantilever beam waveguide 904 may define a mirror 986 that cooperates with the backside mirror 992 to form a laser cavity. The mirror 986 may include grating on a surface of the cantilever beam waveguide 904. The cantilever beam waveguide 904 may be configured to modulate a beam of light produced within a laser cavity between an off state in which no light beam is produced and an on state in which a light beam is produced by moving the mirror of the cantilever beam waveguide into and out of alignment with the mirror of the gain component.

When the mirrors 992, 986 are aligned (e.g., when surfaces of the mirrors facing one another are parallel), the cantilever beam waveguide 904 is optically coupled with the gain component 990, and a beam of light 914 is produced within the laser cavity. When the mirrors are not aligned, the cantilever beam waveguide 904 is not optically coupled with the gain component 990, and no beam is produced, but the gain component 990 may remain energized (e.g., in a higher energy state required for population inversion).

Whereas traditional techniques may modulate a beam from an on state to an off state by reducing or eliminating the energy transfer to the gain component, the embodiments described herein may use the cantilever beam waveguide 904 to move the mirrors 986, 992 out of alignment with one another. Similarly, whereas traditional techniques may modulate a beam from an off state to an on state by initiating or reinitiating energization of the gain component, the embodiments described herein may use the cantilever beam waveguide to move the mirrors 986, 992 into alignment with one another. This may provide numerous advantages over traditional techniques. For example, using the cantilever beam waveguide 904 to bring the mirrors 986, 992 into and out of alignment with one another may result in faster modulation between the off state and the on state than traditional techniques. Additionally, because the energy state of a laser may affect performance of surrounding lasers, maintaining the energy state during modulation may improve performance of surrounding silicon photonics devices.

The gain component 990 may be formed of any suitable material, such as a semiconductor wafer formed at least partially from group III-V semiconductor materials, such as indium(III) phosphide or gallium(III) arsenide.

Figure 10:
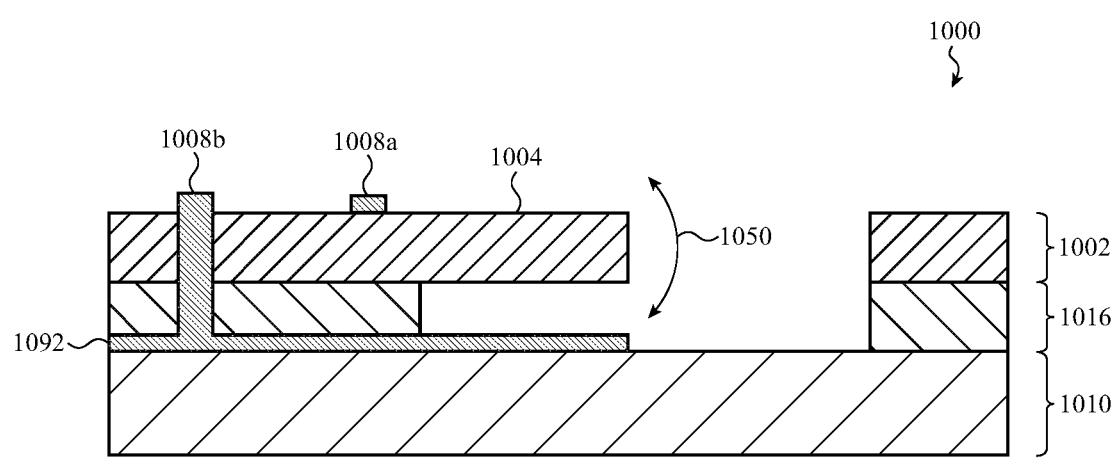
FIG. 10 illustrates a cross-section of an example silicon photonics device in which a cantilever beam waveguide is configured to bend in a direction perpendicular to other layers of the silicon photonics device.

As shown in FIGS. 1A-1D, some cantilever beam waveguides may be configured to bend along a plane that is substantially parallel to other layers of the silicon photonics device. Additionally or alternatively, cantilever beam waveguides may be configured to bend perpendicularly to the other layers. FIG. 10 illustrates an example silicon photonics device 1000 in which a cantilever beam waveguide 1004 is configured to bend in a direction perpendicular to other layers of the silicon photonics device. For example, as shown by the arrows 1050, the cantilever beam waveguide 1004 may bend up and down with respect to FIG. 10. In some cases, the cantilever beam waveguide 1004 may additionally bend into and out of the page with respect to FIG. 10, similar to the cantilever beam waveguide 104. The ability of the cantilever beam waveguide 1004 to bend along two axes may allow it to align with components in two dimensions rather than along a line. Additionally, the cantilever beam waveguide 1004 may be bent upwards to offset bending caused by gravity or other forces acting on the silicon photonics device 1000.

The silicon photonics device 1000 may be similar to the silicon photonics devices 100, 200, 300, 400, 500, 600, 700, 800, 900 discussed herein, and may include similar functionality and/or components. The silicon photonics device 1000 may include the cantilever beam waveguide 1004 formed in the device layer 1002 and configured to receive voltage signals via a contact 1008a. The cantilever beam waveguide 1004 may be formed over a gap in an oxide layer 1016 disposed over a support layer 1010.

Figure 11:
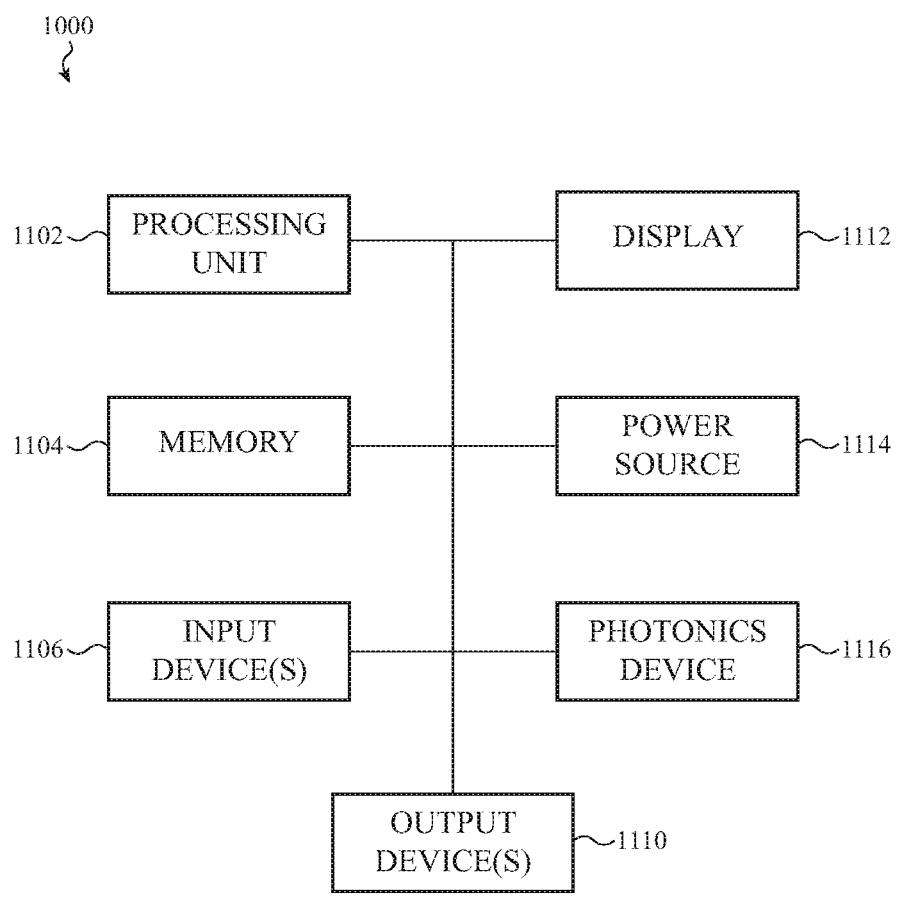
FIG. 11 illustrates a sample electrical block diagram of an electronic device that may incorporate a silicon photonics device such as those described herein.

As described above, the silicon photonics devices described herein may be included in numerous types of electronic devices. FIG. 11 illustrates a sample electrical block diagram of an electronic device 1100 that may incorporate a silicon photonics device such as those described herein. The electronic device may in some cases take the form of any suitable electronic device, including a smartphone, an electronic watch, a tablet, a desktop computer, a laptop, an automobile, a gaming device, a digital music player, a wearable audio device, a device that provides time, a health assistant, and other types of electronic devices that include, or can be connected to a silicon photonics device. The electronic device 1100 can include a display 1112, a processing unit 1102, a power source 1114, a memory 1104 or storage device, one or more input devices 1106, one or more output devices 1110, and a silicon photonics device 1116.

The processing unit 1102 can control some or all of the operations of the electronic device 1100. The processing unit 1102 can communicate, either directly or indirectly, with some or all of the components of the electronic device 1100. For example, a system bus or other communication mechanism 1118 can provide communication between the processing unit 1102, the power source 1114, the memory 1104, the input device(s) 1106, and the output device(s) 1110.

The processing unit 1102 can be implemented as any electronic device capable of processing, receiving, or transmitting data or instructions. For example, the processing unit 1102 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1100 can be controlled by multiple processing units. For example, select components of the electronic device 1100 (e.g., an input device 1106) may be controlled by a first processing unit and other components of the electronic device 1100 (e.g., the display 1112) may be controlled by a second processing unit, where the first and second processing units may or may not be in communication with each other.

The power source 1114 can be implemented with any device capable of providing energy to the electronic device 1100. For example, the power source 1114 may be one or more batteries or rechargeable batteries. Additionally or alternatively, the power source 1114 can be a power connector or power cord that connects the electronic device 1100 to another power source, such as a wall outlet.

The memory 1104 can store electronic data that can be used by the electronic device 1100. For example, the memory 1104 can store electrical data or content such as, for example, audio and video files, documents and applications, device settings and user preferences, timing signals, control signals, and data structures or databases. The memory 1104 can be configured as any type of memory. By way of example only, the memory 1104 can be implemented as random access memory, read-only memory, Flash memory, removable memory, other types of storage elements, or combinations of such devices.

In various embodiments, the display 1112 provides a graphical output, for example associated with an operating system, user interface, and/or applications of the electronic device 1100. In one embodiment, the display 1112 includes one or more sensors and is configured as a touch-sensitive (e.g., single-touch, multi-touch) and/or force-sensitive display to receive inputs from a user. For example, the display 1112 may be integrated with a touch sensor (e.g., a capacitive touch sensor) and/or a force sensor to provide a touch- and/or force-sensitive display. The display 1112 is operably coupled to the processing unit 1102 of the electronic device 1100.

The display 1112 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 1112 is positioned beneath and viewable through a cover that forms at least a portion of an enclosure of the electronic device 1100.

In various embodiments, the input devices 1106 may include any suitable components for detecting inputs. Examples of input devices 1106 include audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1106 may be configured to detect one or more particular types of input and provide a signal (e.g., an input signal) corresponding to the detected input. The signal may be provided, for example, to the processing unit 1102.

As discussed above, in some cases, the input device(s) 1106 include a touch sensor (e.g., a capacitive touch sensor) integrated with the display 1112 to provide a touch-sensitive display. Similarly, in some cases, the input device(s) 1106 include a force sensor (e.g., a capacitive force sensor) integrated with the display 1112 to provide a force-sensitive display.

The output devices 1110 may include any suitable components for providing outputs. Examples of output devices 1110 include audio output devices (e.g., speakers), visual output devices (e.g., lights or displays), tactile output devices (e.g., haptic output devices), communication devices (e.g., wired or wireless communication devices), and so on, or some combination thereof. Each output device 1110 may be configured to receive one or more signals (e.g., an output signal provided by the processing unit 1102) and provide an output corresponding to the signal.

In some cases, input devices 1106 and output devices 1110 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1102 may be operably coupled to the input devices 1106 and the output devices 1110. The processing unit 1102 may be adapted to exchange signals with the input devices 1106 and the output devices 1110. For example, the processing unit 1102 may receive an input signal from an input device 1106 that corresponds to an input detected by the input device 1106. The processing unit 1102 may interpret the received input signal to determine whether to provide and/or change one or more outputs in response to the input signal. The processing unit 1102 may then send an output signal to one or more of the output devices 1110, to provide and/or change outputs as appropriate.

The silicon photonics device 1116 may be similar to one or more silicon photonics devices described herein and may include similar structure and/or functionality. The silicon photonics device 1116 may be configured to perform any of a variety of functions using the electronic device 1100, including, but not limited to, a range-finder, depth finder, (or other distance measurement tool) for a smartphone or other electronic device, a light source for a laser, as part of a photoplethysmogram (PPG) sensor, a light source and/or sensor for time-of-flight distance measurement, a light sensor, and the like. The processing unit 1102 may be electrically coupled to the silicon photonics device 1116 to send signals to the silicon photonics device and/or receive signals from the silicon photonics device. The processing unit 1102 may be configured to cause a cantilever beam waveguide of the silicon photonics device 1116 to bend and/or oscillate, for example by causing voltage signals to be applied to the silicon photonics device 1116 as described herein.

As described above, one aspect of the present technology is the gathering and use of data available from various sources to determine user biometrics. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to more accurately determine user biometrics. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining user biometrics, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, biometrics may be determined based on non-personal information data or a bare minimum amount of personal information, such as the content being requested by the device associated with a user, other non-personal information available to the system, or publicly available information.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A silicon photonics device comprising:
    a silicon support layer;

an oxide layer disposed above the silicon support layer and defining a gap;
a silicon device layer disposed above the oxide layer and comprising:
a first electrode;
a second electrode; and
a cantilever beam waveguide positioned at least partially over the gap and between the first electrode and the second electrode, the cantilever beam waveguide configured to capacitively couple to the first electrode and the second electrode; and
an output coupler formed on or bonded to the silicon device layer and configured to direct at least a portion of light propagating through the cantilever beam waveguide out of the silicon photonics device; wherein:
the first electrode and the second electrode are configured to receive voltage signals that cause the cantilever beam waveguide to bend to selectively optically couple the cantilever beam waveguide with one or more additional components of the silicon photonics device.

2. The silicon photonics device of claim 1, wherein:
the one or more additional components comprise an array of waveguides formed in the silicon device layer;
in a first bending configuration of the cantilever beam waveguide, the cantilever beam waveguide directs light into a first waveguide of the array of waveguides; and
in a second bending configuration of the cantilever beam waveguide, the cantilever beam waveguide directs light into a second waveguide of the array of waveguides.

3. The silicon photonics device of claim 1, wherein:
the first electrode defines a first comb drive formed in the silicon device layer;
the second electrode defines a second comb drive formed in the silicon device layer; and
the first and second comb drives are configured to cause the cantilever beam waveguide to oscillate at a resonant frequency of the cantilever beam waveguide.

4. The silicon photonics device of claim 1, wherein:
the voltage signals comprise:
a first alternating-current voltage signal applied to the first electrode and having a frequency that is equal to a resonant frequency of the cantilever beam waveguide; and
a second alternating-current voltage signal applied to the second electrode and having the frequency, the second alternating-current voltage signal 180 degrees out of phase with the first alternating-current voltage signal; and
the first alternating-current voltage signal and the second alternating-current voltage signal cause the cantilever beam waveguide to oscillate at the resonant frequency.

5. The silicon photonics device of claim 1, wherein:
the silicon device layer defines a first surface facing the oxide layer and a second surface opposite the first surface; and
the silicon photonics device further comprises:
a first contact disposed on the second surface of the silicon device layer in the first electrode and configured to electrically couple the first electrode to a processing unit configured to cause the voltage signals to be generated;
a second contact disposed on the second surface of the silicon device layer in the second electrode and configured to electrically couple the second electrode to the processing unit; and
a third contact disposed on the second surface of the silicon device layer and configured to electrically couple the cantilever beam waveguide to the processing unit.

6. The silicon photonics device of claim 1, wherein the output coupler is formed on or bonded to a surface of the silicon device layer.

7. The silicon photonics device of claim 6, wherein the output coupler is formed on an angled surface of the cantilever beam waveguide.

8. The silicon photonics device of claim 6, further comprising a lens positioned between the cantilever beam waveguide and the output coupler and configured to focus light toward the output coupler.

9. The silicon photonics device of claim 1, wherein a cantilever portion of the cantilever beam waveguide has a length between 200 and 500 microns and a width between 0.1 and 0.4 microns.

10. A silicon photonics device for an electronic device, comprising:
a cantilever beam waveguide formed in a silicon device layer and configured to optically couple with a component of the silicon photonics device;
a first comb drive formed in the silicon device layer and coupled to a first side of the cantilever beam waveguide;
a second comb drive formed in the silicon device layer and coupled to a second side of the cantilever beam waveguide opposite the first side; and
an output coupler formed on or bonded to the silicon device layer and configured to direct at least a portion of light propagating through the cantilever beam waveguide out of the silicon photonics device; wherein:
the first comb drive and the second comb drive are configured to receive voltage signals to actuate the first comb drive and the second comb drive to cause the cantilever beam waveguide to oscillate at a resonant frequency of the cantilever beam waveguide; and
in a first bending configuration of the cantilever beam waveguide during oscillation, the cantilever beam waveguide is optically coupled to the component of the silicon photonics device; and
in a second bending configuration of the cantilever beam waveguide during oscillation, the cantilever beam waveguide is not optically coupled to the component of the silicon photonics device.

11. The silicon photonics device of claim 10, wherein:
the component is a first waveguide of an array of waveguides comprising the first waveguide and a second waveguide; and
in the second bending configuration, the cantilever beam waveguide is optically coupled to the second waveguide.

12. The silicon photonics device of claim 10, wherein:
the component is gain component comprising a first mirror;
the cantilever beam waveguide comprises a second mirror configured to align with the first mirror to define a laser cavity; and
oscillating the cantilever beam waveguide modulates a beam of light produced in the laser cavity between an off state and an on state.

13. The silicon photonics device of claim 12, wherein the gain component comprises a III-V semiconductor material.

14. The silicon photonics device of claim 10, wherein the first comb drive and the second comb drive are radial comb drives.

15. An electronic device comprising:
a silicon photonics device comprising:
- a first electrode;
- a second electrode;
- a cantilever beam waveguide positioned between the first electrode and the second electrode and configured to bend to selectively align with one or more additional components of the silicon photonics device;

an output coupled to the silicon photonics device and configured to direct at least a portion of light propagating through the cantilever beam waveguide out of the silicon photonics device; and a processing unit configured to cause voltage signals to be applied to the first electrode and the second electrode to cause the cantilever beam waveguide to bend.

16. The electronic device of claim 15, wherein:
the electronic device is a wearable electronic device; and
the silicon photonics device is included in a PPG sensor of the wearable electronic device.

17. The electronic device of claim 15, wherein the processing unit is configured to use the silicon photonics device to perform a distance measurement.

18. The electronic device of claim 15, wherein the voltage signals cause the cantilever beam waveguide to oscillate.

19. The electronic device of claim 15, wherein:
the one or more additional components of the silicon photonics device comprise an array of waveguides; and
the cantilever beam waveguide is configured to direct light into each waveguide of the array of waveguides.

* * * * *